(12) United States Patent
Franchuk et al.

(10) Patent No.: US 8,060,668 B2
(45) Date of Patent: Nov. 15, 2011

(54) LOW LATENCY DATA PACKET RECEPTION AND PROCESSING

(75) Inventors: Brian A. Franchuk, Richfield, MN (US); Roger R. Benson, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 2073 days.

(21) Appl. No.: 10/936,421

(22) Filed: Sep. 8, 2004

(65) Prior Publication Data

US 2006/0053237 A1    Mar. 9, 2006

(51) Int. Cl.
*G06F 3/00* (2006.01)
(52) U.S. Cl. .......................................................... 710/29
(58) Field of Classification Search .................. None
See application file for complete search history.

(56) References Cited

U.S. PATENT DOCUMENTS

| | | | |
|---|---|---|---|
| 6,304,934 B1 * | 10/2001 | Pimenta et al. | 710/305 |
| 6,564,268 B1 | 5/2003 | Davis et al. | |
| 6,658,596 B1 * | 12/2003 | Owen et al. | 714/16 |
| 6,745,389 B1 * | 6/2004 | Hostyn et al. | 719/315 |
| 6,799,229 B1 * | 9/2004 | Lin | 710/52 |
| 7,234,084 B2 * | 6/2007 | Franchuk et al. | 714/47 |
| 7,251,759 B2 * | 7/2007 | Turner et al. | 714/719 |
| 7,496,099 B2 * | 2/2009 | Franchuk et al. | 370/395.4 |

FOREIGN PATENT DOCUMENTS

| | | |
|---|---|---|
| EP | 0239937 A2 | 3/1987 |
| EP | 0353927 A2 | 7/1989 |

* cited by examiner

*Primary Examiner* — Tariq Hafiz
*Assistant Examiner* — Aurangzeb Hassan
(74) *Attorney, Agent, or Firm* — Kinney & Lange, P.A.

(57) ABSTRACT

Devices in a process control system communicate by data messages over a communication medium segment. Each device includes a communication controller that includes a data queue and a queue of received message objects. The data queue stores a plurality of messages received on the communication medium. The received message objects contain information about a corresponding message in the data queue.

19 Claims, 5 Drawing Sheets

LOW LATENCY DATA PACKET RECEPTION AND PROCESSING

BACKGROUND OF THE INVENTION

The present invention relates to a communications controller for use in field instruments and other devices of process control systems. In particular, the present invention is a system and method for low latency data packet reception and processing in a communications controller.

In a typical industrial plant, a distributed control system (DCS) is used to control many of the industrial processes performed at the plant. Typically, the plant has a centralized control room having a computer system with user input/output (I/O), disc I/O, and other peripherals as are known in the computing art. Coupled to the computing system are a controller and a process I/O subsystem.

The process I/O subsystem includes of I/O ports which are connected to various field devices throughout the plant. Field devices include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights. The term "field device" encompasses these devices, as well as any other device that performs a function in a distributed control system.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 milliamps running through the loop. An analog field device that transmits a signal to the control room modulates the current running through the current loop, with the current proportional to the sensed process variable. On the other hand, an analog field device that performs an action under control of the control room is controlled by the magnitude of the current through the loop, which is modulated by the I/O port of the process I/O system, which in turn is controlled by the controller. Traditional two-wire analog devices having active electronics can also receive up to 40 milliwatts of power from the loop. Analog field devices requiring more power are typically connected to the control room using four wires, with two of the wires delivering power to the device. Such devices are known in the art as four-wire devices and are not power limited, as are two-wire devices.

In contrast, traditional discrete field devices transmit or respond to a binary signal. Typically, discrete field devices operate with a 24-volt signal (either AC or DC), a 110- or 240-volt AC signal, or a 5-volt DC signal. Of course, a discrete device may be designed to operate in accordance with any electrical specification required by a particular control environment. A discrete input field device is simply a switch which either makes or breaks the connection to the control room, while a discrete output field device will take an action based on the presence or absence of a signal from the control room.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve between an open and closed position, inclusive, based on the magnitude of the current flowing through the two-wire twisted pair.

More recently, hybrid systems that superimpose digital data on the current loop have been used in distributed control systems. One hybrid system is known in the control art as the Highway Addressable Remote Transducer (HART) and is similar to the Bell 202 modem specification. The HART system uses the magnitude of the current in the current loop to sense a process variable (as in the traditional system), but also superimposes a digital carrier signal upon the current loop signal. The carrier signal is relatively slow, and can provide updates of a secondary process variable at a rate of approximately 2-3 updates per second. Generally, the digital carrier signal is used to send secondary and diagnostic information and is not used to realize the primary control function of the field device. Examples of information provided over the carrier signal include secondary process variables, diagnostic information (including sensor diagnostics, device diagnostics, wiring diagnostics, and process diagnostics), operating temperatures, temperature of the sensor, calibration information, device ID numbers, materials of construction, configuration or programming information, etc. Accordingly, a single hybrid field device may have a variety of input and output variables and may implement a variety of functions.

HART is an industry standard nonproprietary system. However, it is relatively slow. Other companies in the industry have developed proprietary digital transmission schemes which are faster, but these schemes are generally not used by or available to competitors.

More recently, a newer control protocol has been defined by the Instrument Society of America (ISA). The new protocol is generally referred to as Fieldbus. Fieldbus is a multi-drop serial digital two-way communications protocol intended for connecting field instruments and other process devices such as monitoring and simulation units in distributed control systems. Fieldbus allows enhanced digital communication over previous process control loop methods while maintaining the ability to power process devices coupled to the Fieldbus loop and while meeting intrinsic safety requirements.

Two reasonably standardized industrial Fieldbus protocols are Foundation Fieldbus and Profibus. The physical layer of the Fieldbus protocols are defined by Instrument Society of America standard ISA-S50.02-1992, and its draft two extension dated 1995. The Fieldbus protocol defines two subprotocols. An H1 Fieldbus network transmits data at a rate up to 31.25 kilobits per second (Kbps) and provides power to field devices coupled to the network. The H1 physical layer sub-protocol is defined in Clause 11 of the ISA standard, part two approved in September 1992. An H2 Fieldbus network transmits data at a rate up to 2.5 megabits per second (Mbps), does not provide power to field devices connected to the network, and is provided with redundant transmission media.

Fieldbus provides significant capabilities for digitally communicating immense amounts of process data. Thus, there is a continuing need to develop process control devices capable of maximizing fieldbus communication effectiveness.

BRIEF SUMMARY OF THE INVENTION

The present invention is a communication controller for use in a device on a network that processes messages received over a communication medium. The communications controller includes a data queue and a queue of received message objects. The data queue stores a plurality of messages received on the communication medium. The received messages are preferably written to the received data memory at a write pointer position and read from the received data memory at a read pointer position. The communications controller also includes received message objects. Each received message object contains information about a corresponding message in the data queue.

Each received message object preferably contains a plurality of attributes, including Overflow, Underflow, DataReady, EndPosition, and an active flag. Overflow indicates whether an overflow occurred in the data queue while receiving a message from the communication medium. Underflow indicates whether a read from the data queue failed due to lack of data. DataReady indicates that the data queue is almost full based on a threshold queue depth maintained in the device. EndPosition stores position information from the data queue. The active flag selects and enables the received message object.

DETAILED DESCRIPTION

Process Control System Overview

The present invention relates to a communication controller for use in field instruments and other devices of process control systems. The purpose of the communication controller is to perform a substantial portion of the link layer processing of messages and timer management, thereby freeing the application processor or CPU to perform other functions. For the purpose of this detailed description, the communication controller will be described in the context of a system using the Foundation Fieldbus communications protocol, although it has general applicability to packet-based communication protocols.

The fieldbus physical layer defines the electrical characteristics of the physical means of transmission and reception of the communications protocol data in the form of a Physical Layer Protocol Data Unit (PhPDU). In addition, the fieldbus physical layer specifies the symbol encoding, message framing, and error detection method. The ISA fieldbus standard defines three signaling speeds and two modes of coupling. For purposes of this description, the invention will be described in the context of the H1 physical layer defined in clause 11 of ISA S50.02 Standard, Part 2. That clause covers a 31.25 Kbps, voltage mode, wire medium, with a low-power option. This option allows for a device connected to the communications medium to receive its operational power from the communications medium. The physical layer can be capable of meeting the intrinsic safety requirements for hazardous environments. The protocol operates on low-grade twisted pair cable and supports multiple devices, in accordance with the voltage and current limitations which are defined by the standard.

Figure 1:
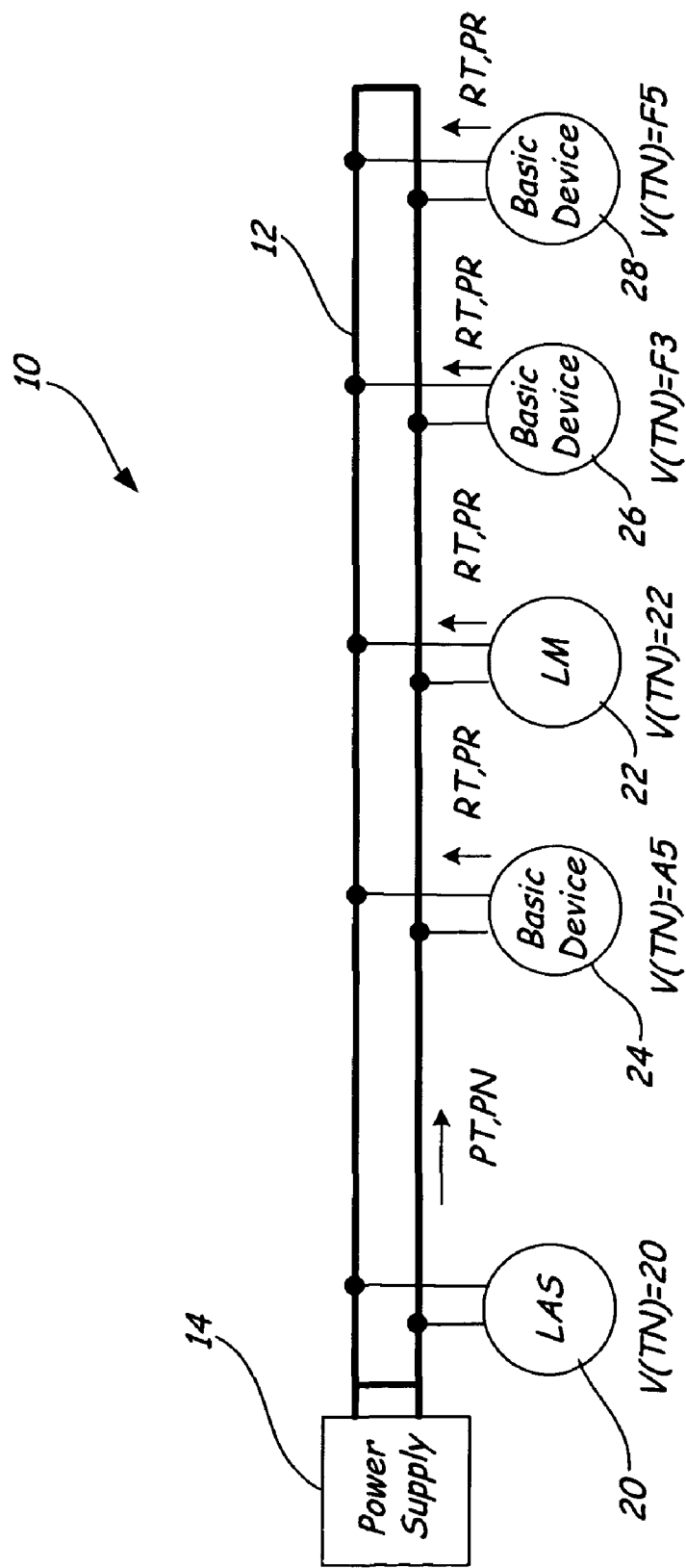
FIG. 1 is a diagram of a process control system with digital communication between devices over a communication medium segment.

FIG. 1 shows a typical process control system 10 including segment 12, power supply 14 and five devices: Link Active Scheduler (LAS) device 20, Link Master (LM) device 22, and basic devices 24, 26, and 28. Segment 12 can support up to thirty-two devices on a single pair of wires. Typically, segment 12 will have from four to sixteen devices, based on loop execution speed, power, and intrinsic safety requirements.

LAS device 20 maintains a central schedule for all the communication between devices on segment 12. LAS device 20 improves the overall communication reliability by sending Compel Data (CD) Data Link Protocol Data Units (DLPDUs) to each device to transmit back cyclic data which is then scheduled to do so. LAS device 20 serves as the local source of Data Link time (DL-time) on segment 12. A DLPDU is the data content of the PhPDU message that is communicated across segment 12.

LM device 22 is configured to take over the responsibilities of LAS device 20 should LAS device 20 fail or become inoperable. Although only LM device 22 is shown in FIG. 1, more than one Link Master device can be present on a segment. This allows for the case if both the Link Active Scheduler and the first Link Master were to fail, then the second Link Master can take over for the Link Active Scheduler. Once the Link Active Scheduler is disabled, the Link Master takes over the functionality of the Link Active Scheduler.

Each device has a unique address called the V(TN), which represents the local node-ID(This_Node). In the example shown in FIG. 1, LAS device 20 has an address V(TN)=20; LM device 22 has address V(TN)=22; basic device 24 has address V(TN)=A5; basic device 26 has address V(TN)=F3; and basic device 28 has address V(TN)=F5.

LAS device 20 sends Pass Token (PT) and Probe Node (PN) messages to all devices on segment 12. Each of the other devices (LAS device 22 and basic devices 24, 26, 28) send Return Token (RT) and Probe Response (PR) messages back to LAS device 20, as appropriate.

Each basic device 24, 26, 28 only needs to see its own PT and PN messages that are sent by LAS device 20. PT and PN messages have a designation address (DA) encoded in the second byte of the DLPDU. LAS device 20 passes a token (PT) or probes a node (PN) one at a time to all devices on segment 12.

Once basic device 24, 26, or 28 receives a PT message with a designation address equal to that device's unique address (DA=V(TN)), it then will respond back to LAS device 20 with an RT message. If basic device 24, 26, or 28 receives a PN DLPDU with DA=V(TN), it is required to respond back with a PR message.

The transmission of PT and PN messages from LAS 20 and RT and PR messages to LAS 20 creates several messages on segment 12 that a particular basic device 24, 26, 28 does not need to receive and take action on. Each basic device 24, 26, 28 only needs to respond to PT and PN messages addressed to that particular device. Constantly getting interrupted by PT and PN messages from LAS 20 that are addressed to other devices, as well as RT and PR messages from other devices addressed to LAS device 20, can create undue processing time to handle these "nuisance interrupts." With basic devices 24, 26, and 28, DLPDU filtering can be used to reduce the number of interrupts that the basic device has to process. On the other hand, LAS device 20 must process every message on segment 12.

All devices on segment 12 transmit data onto segment 12 as a Manchester encoded baseband signal. With Manchester encoding, "0" and "1" are represented by transitions that occur from low-to-high and high-to-low, respectively, in the middle of the bit period. For fieldbus, the nominal bit time is 32 microseconds (μsec), with the transition occurring at 16 μsec. The Manchester encoding rules have been extended to include two additional symbols, non-data plus (N+) and non-data minus (N−), wherein no transition occurs during the bit period and the Manchester encoded baseband signal remains high (N+) or low (N−).

Message Format

Figure 2:
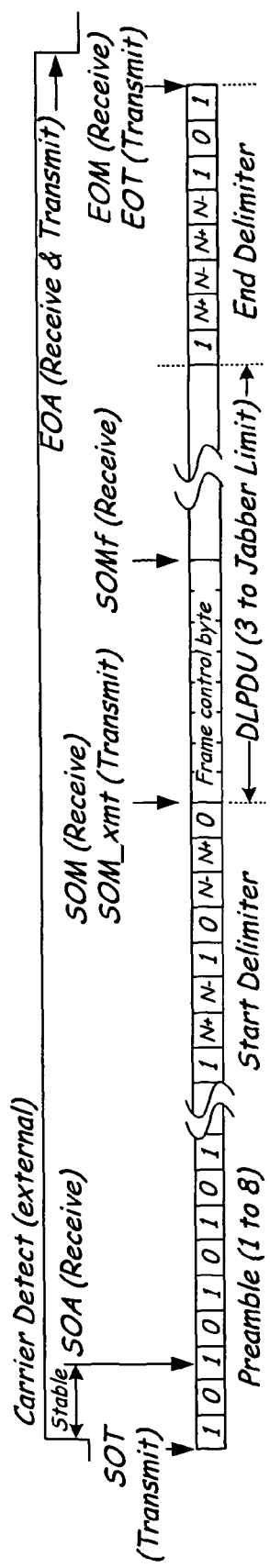
FIG. 2 shows a message format for communications between devices of the process control system of FIG. 1.

FIG. 2 shows the format of a Physical Layer Protocol Data Unit (PhPDU) used to transmit messages over segment 12. The PhPDU includes a preamble, a Start Delimiter (SD) a Data Link Protocol Data Unit (DLPDU) and an End Delimiter (ED). The preamble is the first several bits of the PhPDU message. The fieldbus specification allows for one to eight bytes of preamble. The device receiving the message uses the preamble to synchronize with the incoming message. As shown in FIG. 2, the sequence of the first byte of the preamble is 1 0 1 0 1 0 1 0.

The Start Delimiter (SD) immediately follows the preamble. There is one SD per message. The fieldbus specification requires that the SD have non-character data (N+ and N−), which always appear in the SD message in complementary pairs. This encoding scheme makes the SD unique and impossible to confuse with the data portion (DLPDU) of the message. The sequence shown in FIG. 2 for the SD is 1 N+N−1 0 N−N+0.

The DLPDU is a variable length message. It contains a Frame Control (FC) byte as its first byte and a Frame Check Sequence (FCS) check sum as its final two bytes. The length of DLPDU is variable, with a minimum of three bytes (in the case of an RT message) up to a jabber limit of, for example, about 300 bytes.

The End Delimiter (ED) follows the DLPDU. It represents the last byte of any PhPDU message transmitted over segment 12. Similar to the SD, the ED includes non-character data in complementary pairs. This encoding scheme makes the ED unique and impossible to confuse with the DLPDU. The sequence shown in FIG. 2 for the End Delimiter is 1 N+N−N+N−1 0 1.

FIG. 2 also shows a Carrier Detect signal. The purpose of the Carrier Detect signal is to indicate when (a) an incoming PhPDU message is present on segment 12 or (b) a device is transmitting a message onto segment 12.

Start of Transmit (SOT) occurs at the moment that a Transmit Enable (TxE) goes active, i.e., when the preamble of a PhPDU message is first presented to segment 12.

Start of Activity (SOA) occurs after the Carrier Detect signal goes active and has been stable for at least one bit time or two bit times (approximately 16 to 32 μsec). This time depends on when the Carrier Detect goes active with respect to the internal clock of the device receiving the message. This allows the communication controller of the device to ignore noise glitches that are most apt to occur at the front end of the preamble. Additional time is used to synchronize with the bit boundaries to eliminate the potential for short noise bursts on segment 12 being misinterpreted as activity. For a transmitted message, SOA occurs once the Transmit Enable goes active (i.e., the preamble of the PhPDU is presented to segment 12).

Start of Message (SOM) occurs at the beginning of the first bit of when the FC byte is detected for a received message.

SOM_xmt is the Start of Message Transmit, which occurs at the beginning of the first bit of when the FC byte is detected for a transmitted message.

SOMf is an SOM of a received filtered DLPDU. This occurs when the communication controller within the device has detected enough information to make the determination that the incoming message is to be filtered.

End of Message (EOM) occurs at the end of the last bit of the ED being encountered in a received message. End of Transmission (EOT) occurs at the end of the last bit of the ED a transmitted message.

End of Activity (EOA) occurs when the Carrier Detect has gone inactive. The EOA occurs for both transmitted and received DLPDUs.

Device Architecture

Figure 3:
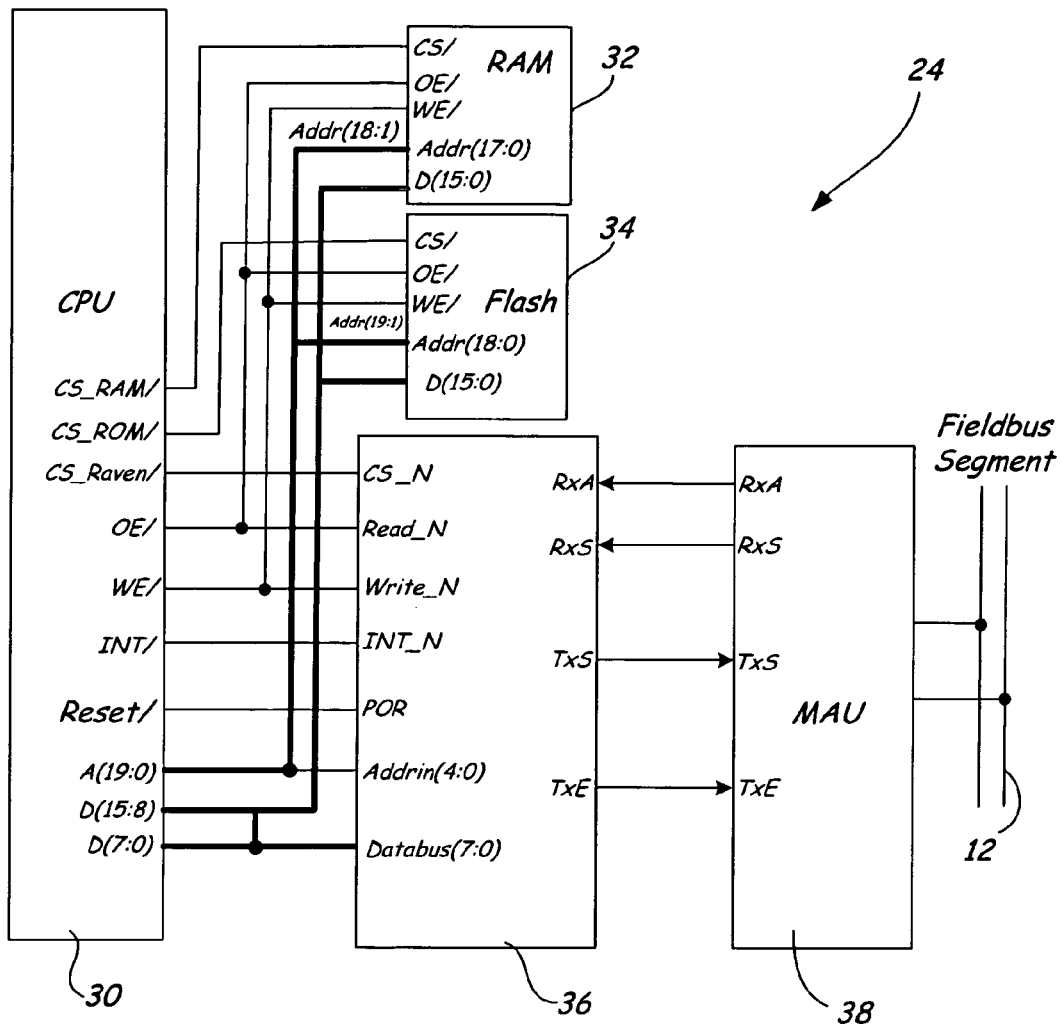
FIG. 3 is a block diagram of a device of the process control system.

FIG. 3 shows a block diagram of the communications portion of basic device 24, which is representative of the architecture in each of devices 20-28. Basic device 24 includes central processing unit (CPU) 30, random access memory (RAM) 32, flash memory 34, communications controller 36, and medium attachment unit (MAU) 38.

In the embodiment shown in FIG. 3, CPU 30 is a microprocessor such as Motorola 68LC302, Motorola Mcore 2075, Motorola PowerPC 850, Atmel Thumb processor AT91M40800 and others. CPU 30 is an 8-bit or higher processor.

In the embodiment shown in FIG. 3, communication controller 36 is an application specific integrated circuit (ASIC) chip that serves as an interface between MAU 38 and CPU 30. It transmits and receives encoded Manchester data to and from external analog circuitry connected to fieldbus segment 12. After receiving the serial data from MAU 38, communication controller 36 decodes the data, forms the data into bytes, strips off the preamble, SD, and ED, (and, optionally, the FCS bytes) and provides the message data for the link layer to read. For data transmission, communication controller 36 receives bytes of DLPDU data from the link layer and adds the preamble, the SD, optionally generates the FCS, and adds the ED. Communication controller 36 then forms serially encoded Manchester data, which is sent to MAU 38 for transmission on fieldbus segment 12.

Communication between communication controller 36 and MAU 38 is provided through four signals: RxS, RxA, TxS, and TxE. RxS is the received Manchester Encoded serial data. RxA is the Carrier Detect signal for received data. TxS is the transmitted encoded serial data. TxE is the transmit enable signal.

In other embodiments of the invention, communication controller 36 can be formed on a common integrated circuit with CPU 30. In addition, RAM 32 and flash memory 34 may also be combined with CPU 30 in some embodiments. In the case of LAS device 20, CPU 30, RAM 32 and flash memory 34 may be a part of a host computer system of process control system 10.

MAU 38 provides the network connection to Fieldbus segment 12. MAU 38 may be an integrated circuit, or discrete components can be used to form MAU 38.

Communication Controller 36

Figure 4:
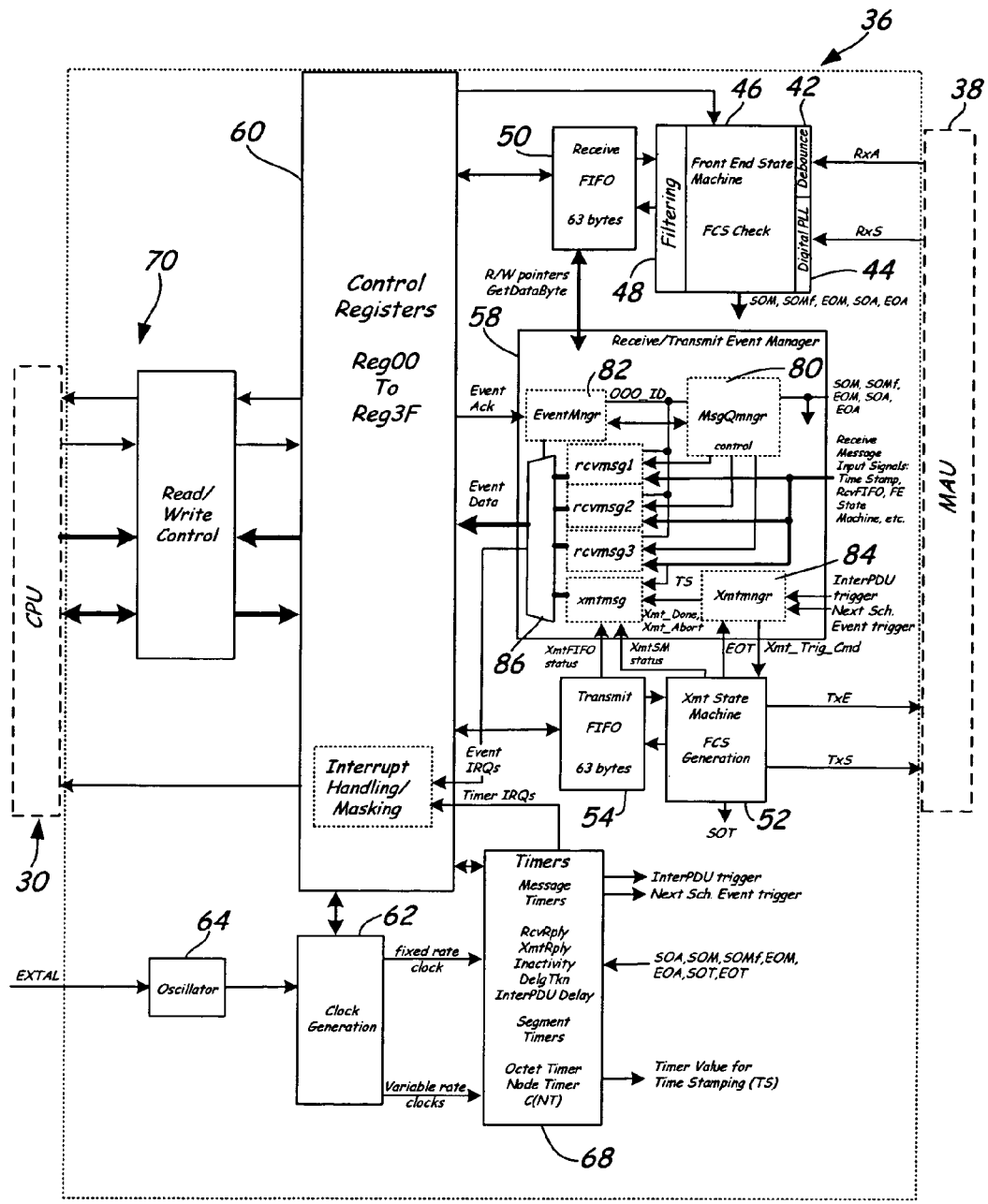
FIG. 4 is a functional block diagram of a communication controller of the device of FIG. 3.

FIG. 4 is a functional block diagram of communication controller 36. In this embodiment, communication controller 36 includes debounce circuit 42, digital phase lock loop (PLL) 44, front end state machine 46, receive message filtering 48, receive first-in-first-out (FIFO) memory 50, transmit state machine 52, transmit FIFO memory 54, transmit driver circuitry 56, receive/transmit event manager 58, registers 60, clock generation circuitry 62, oscillator 64, timers 68, and CPU interface circuitry 70.

When an incoming message is detected by MAU 38, a Carrier Detect signal is provided to communication controller 36 at the RxA input, and the incoming asynchronized Manchester data is provided at the RxS input. The RxA and RxS inputs are presented to front end state machine 46. Digital PLL 44 recovers and regenerates the clock from the incoming serial Manchester encoded data. This regenerated clock is then used to clock front end state machine 46.

Front end state machine 46 detects the incoming serial bit stream RxS. It strips off the preamble, SD, and ED, and stores the DLPDU into receive FIFO memory 50. Front end state machine 46, together with receive message filtering 48, can be configured to filter out specific frame controls, plus Probe Node (PN) and Pass Token (PT) messages addressed to other devices. Front end state machine 46 keeps track of the number of bytes that have been written into receive FIFO memory 50. The FCS is automatically verified at the end of each message, and can be optionally stored into receive FIFO memory 50.

Front end state machine 46 also provides signals representing specific events it has detected. These include the SOM, SOMf, EOM, SOA, and EOA event pulses.

Front end state machine 46 is activated when the RxA line goes active. Front end state machine 46 then synchronizes with the edges of the preamble field and decodes the Manchester encoded data of the RxS signal. The SOA event indicates that front end state machine 46 has started.

Once the preamble has been detected, front end state machine 46 waits for the Start Delimiter (SD) sequence. After the SD has been detected, front end state machine 46 converts the serial data stream into octets, and writes them to receive FIFO memory 50 in 8-bit bytes. Front end state machine 46 continues writing new octets of data into receive FIFO memory 50 until the End Delimiter (ED) is detected, or until receive FIFO memory 50 is full.

When the ED has been detected, front end state machine 46 waits for the RxA line to go inactive, which is indicated by the EOA event.

With the RxA line inactive, front end state machine 46 returns to its initial state. It remains in that initial state until the next activity on fieldbus segment 12 (i.e., until a Carrier Detect signal is provided at RxA again).

Filtering circuitry is used for basic devices, to reduce IRQ loading on messages that are not important to the device. In contrast, a device configured as an LAS must receive all messages on the segment and therefore must have filtering disabled. When filtering is disabled, all received messages will be stored in receive FIFO memory 50 and will be passed on to registers 60 and then to CPU 30. SOMf is a Start Of Message signal for a received filtered DLPDU. It occurs when front end state machine 46 has determined that the received message has detected enough information to determine that the incoming message is to be filtered.

With filtering enabled, messages that are filtered are not stored in received FIFO memory 50. For filtered messages, SOMf will not be generated, therefore no event or IRQ will occur.

Examples of filtered messages are Return Token (RT), idle, Request Interval (RI) and Probe Response (PR) DLPDU messages will always be rejected. These are identified based upon the Frame Control (FC) byte. Pass Token (PT) and Probe Node (PN) messages will be accepted if the destination address in the message matches the address for the device. If the destination address does not match, then the PT and PN messages are rejected.

The ability to filter message types based on the FC byte and based upon the destination address reduces the software interrupt loading by limiting the number of interrupt requests (IRQs) that CPU 30 must process.

Front end state machine 46 and receive FIFO memory 50 are used to parse the serial data frames from MAU 38. CPU 30 reads the data from receive FIFO memory 50 and places it in its local memory space to decode the received DLPDU.

Receive FIFO memory 50 is 63 bytes by eight bits wide. Receive FIFO memory 50 will store all of the DLPDU bytes up to three complete received messages (up to a total of 63 bytes). Front end state machine 46 decodes the serial data stream from the filtered RxS signal, and converts it to an 8-bit parallel formatted byte. After the formation of the byte, front end state machine 46 creates a write pulse that stores the coded data into the location that is pointed to by a write pointer. After the write operation is complete, the write pointer is incremented to store the next DLPDU byte.

CPU 30 interfaces with a read pointer to receive FIFO memory 50. Any read from the receive FIFO register of registers 60 (which contains the actual DLPDU data) places the 8-bit data from receive FIFO memory 50 immediately onto the data bus for reading by CPU 30. After the read operation is complete, the read pointer is incremented. This can be continued until receive FIFO memory 50 is empty.

To prevent an overflow condition from occurring in receive FIFO memory 50, there is a register within registers 60 that allows an IRQ to be generated if receive FIFO memory 50 is approaching a full condition. The threshold for generating the IRQ is configurable.

Transmit state machine 52 reads the DLPDU data to be transmitted from transmit FIFO memory 54. The preamble, SD, and ED are automatically inserted. To start transmit state machine 52, the interPDU trigger or, optionally, the Next Scheduled Event trigger needs to be activated to commence the transmit operation. Transmit state machine 52 keeps track of the number of bytes that have been transmitted. An error status will be indicated if there is an underflow or transmitted count violation. The FCS can be optionally transmitted automatically as the last two bytes of the DLPDU.

Transmit state machine 52 encodes the Manchester serial data supplied through interface circuitry 70 on the TxS line to MAU 38 to be presented on fieldbus segment 12. Transmit state machine 52 also asserts the Transmit Enable (TxE) line at the instant that the first bit the first preamble is sent until the last bit of the ED occurs. Transmit state machine 52 also generates the Start Of Transmission (SOT) event signal when it asserts the TxE line, and generates the End Of Transmission (EOT) event signal when the TxE line returns to inactive.

Transmit FIFO memory 54 will store all of the DLPDU bytes that are required for a message to be transmitted, up to a total of 63 bytes. A configurable threshold can be set to send an IRQ telling CPU 30 when transmit FIFO memory 54 is almost empty. In that way, if more than 63 bytes are required to be transmitted, CPU 30 is notified so that it can add more data to transmit FIFO memory 54. This continues until all DLPDU bytes have been written. CPU 30 writes to transmit FIFO memory 54 using a write pointer, while transmit state machine 52 reads bytes from transmit FIFO memory 54 using a read pointer.

Communication controller 36 works on events, and must be capable of handling the occurrence of multiple events. Examples of events include an SOM, EOM, or EOA for a received message or an EOT for a transmitted message. Receive/transmit event manager 58 manages all of the events that occur for up to a total of three received messages and one transmitted message.

As shown in FIG. 4, receive/transmit manager 58 includes three received message objects labeled rcvmsg1, rcvmsg2, and rcvmsg3, and one transmit message object labeled xmtmsg. In addition, receive/transmit manager 58 includes message queue manager (MsgQmngr) 80, event manager (EventMngr) 82, transmit manager (xmtmngr) 84, and event MUX 86.

Receive FIFO memory 50 is capable of storing the DLPDU bytes for up to three complete received messages. Each of those three messages has a corresponding object rcvmsg1, rcvmsg2, and rcvmsg3. Each object contains the status of all of the IRQs, message errors, and time stamping that occur for its corresponding received message. This information constitutes the event data for that message.

The status of all IRQs, message errors, and time stamping that occur for a transmit message are stored in the xmtmsg object. The stored information constitutes the event data for the transmitted message.

MsgQmngr 80 controls the selection and the enabling of the three received messages. Only one rcvmsg object can be active at a time. MsgQmngr 80 allows the events to be associated with the active received message. In the case of a fourth message being received before the other three messages have been acknowledged by CPU 30, MsgQmngr 80 disables any further messages from being received until the event data has been read or acknowledged.

EventMngr 82 manages the order of occurrence of events. As events occur, event manager 82 assigns each event an order of occurrence identification (OOO_ID). This allows CPU 30 to read the events one at a time as they occur. CPU 30 must acknowledge each event as it occurs. After the first event has been acknowledged, the subsequent event will be ready for CPU 30 to read.

Xmtmgr 84 monitors the InterPDU trigger (InterPDU_trig) and the Next Scheduled Event trigger and initiates the Transmit Trigger Command (Xmt_Trig_Cmd) to transmit state machine 52 to cause the next message to begin to be transmitted.

Communication controller 36 includes registers 60. These registers designated REG00-REG3F can be written to and read from by CPU 30. Interrupts (IRQs) are also handled through registers 60.

Clock generation circuitry 62 receives an external clock and either uses that clock or the clock signals from its internal oscillator 64 to generate all necessary clock signals for communication controller 36.

Clock generation circuitry 62 preferably has the capability of currently adjusting both its node timer and its octet timer clock rates. This allows communication controller 36 to synchronize the relationship of its Node Time with the Link Address Scheduler (LAS 20). Octet Time is used for internal message timing, while Node Time is used to share a common sense of time across fieldbus segment 12.

Timer 68 will be divided into two groups, representing different senses of time. A first set of timers called segment timers, operate based on a variable clock rate produced by clock generation circuitry 62 under software control from CPU 30. A second set of timers, called message timers, operates on a fixed rate clock.

There are two segment timers in communication controller 36. The first segment timer is a Node timer, which has a clock tick rate of 31.25 μsec (32 kHz). The Node timer is used to implement the Next Function Block Execution Time, Link Schedule Time V(LST), and Data Link Time (DL-Time).

The second segment timer is the Octet Timer, which has a clock tick rate of 2 μsec (500 kHz). The Octet Timer is used for the Next Scheduled Event trigger (which interfaces to transmit state machine 52 for transmitting messages at a specific time). When the clock rate is adjusted, the Node and Octet timers will track one another at the same rate. This is because the clock signals driving the Node timer and the Octet timer are derived from a common variable clock.

The message timers are started and stopped based upon fieldbus message events (transmit and receive). The message timers include an inactivity timer, an interPDU delay timer, a receive reply timer, a transmit reply timer, a delegated token recovery timer.

The inactivity timer is a decrementing counter. It is used for measuring the idle time between two PhPDUs. The inactivity timer works on both filtered and non-filtered received messages as well as any transmitted messages on fieldbus segment 12. When commanded to start, the inactivity timer will decrement every 16 μsec. The inactivity timer starting point is determined from a configurable preloaded set point loaded into one of registers 60. The decrementing of the inactivity timer can be cancelled or stopped via events that are related to either a received or transmitted message. If the timer ever reaches 0 or expires, an IRQ will be generated. The inactivity timer will remain at 0 until the IRQ is acknowledged. If the IRQ remains high, no additional message events that occur will effect the inactivity timer until this IRQ is acknowledged.

The interPDU delay timer is an incrementing counter. It is used in conjunction with a V(MID) threshold register to implement the fieldbus V(MID) minimum-interPDU delay that insures a minimum time duration (or gap time) of non-transmission between a transmitted or received message. The interPDU timer is affected by both filtered and non-filtered received messages as well as any transmitted messages on the fieldbus segment. When there is no fieldbus activity, the interPDU timer will continuosly increment. Once the count value equals or exceeds a predetermined value stored in a register 60, the InterPDU_trig signal will go active. This signal is used for determining that the interPDU delay time has been met. This signal interfaces to xmtmngr 84 to give the command that a transmitted DLPDU can commence.

The receive reply timer is a decrementing counter. It is used to allow a subscribing device to monitor for an immediate response to a Compel Data (CD) DLPDU. It is also used for a device to monitor its own address when coming on line. When commanded to start, the receive reply timer will decrement every 16 μsec. The receive reply timer starting point is determined from a configurable preloaded 16-bit set point loaded into one of registers 60. The decrementing of the receive reply timer can be cancelled or stopped via either a SOM or SOT event. If the receive reply timer ever reaches 0 or expires, an IRQ will be generated. The receive reply timer requires that the IRQ be enabled for the IRQ to be generated. The receive reply timer will remain at 0 until the IRQ is acknowledged. If the IRQ remains high, no additional message events that occur will affect the receive reply timer until this IRQ is acknowledged.

The transmit reply timer is a decrementing counter. It allows a device to monitor for an immediate response after transmitting one of several DLPDUs (e.g., compel data, pass token). When commanded to start, the transmit reply timer will decrement every 16 μsec. The transmit reply timer starting point is determined from a configurable preloaded set point loaded into one of registers 60. The decrementing of the transmit reply timer can be cancelled or stopped via either a SOM event or SOT event of any transmitted DLPDU except that of a Probe Node (PN). If the transmit reply timer ever reaches 0 or expires, an IRQ will be generated. The transmit reply timer will remain at 0 until the IRQ is acknowledged. If the IRQ remains high, no additional message events that occur will affect the transmit reply timer until this IRQ is acknowledged.

The delegated token recovery timer is a decrementing counter. It is used for monitoring the idle time of receiving a delegated token from another device. The delegated token recovery timer works on both filtered and non-filtered received messages as well as any transmitted messages on fieldbus segment 12. When commanded to start, the delegated token recovery timer will decrement every 16 μsec. The delegated token recovery timer starting point is determined from a configurable preloaded set point loaded into one of registers 60. The decrementing of the delegated token recovery timer can be cancelled or stopped via events that are related to either a received or transmitted message. If the delegated token recovery timer ever reaches 0 or expires, an IRQ will be generated. The delegated token recovery timer will remain at 0 until this IRQ is acknowledged. If the IRQ remains high, no additional message events that may happen to occur will affect the delegated token recovery timer until this IRQ is acknowledged.

Low Latency Data Packet Processing

When receiving packets of information from segment 12, queuing the data packets in receive FIFO memory 50 allows for software latency. In addition to the data packet itself, communication controller 36 must maintain information about the reception state (e.g., whether bytes of the packet are still being received from the network). Because communication controller 36 is capable of queuing multiple packets of data in receive FIFO memory 50, it is essential that it be able to associate the data packet with the information related to the state of its reception. The hardware of a communication control system can be designed to mimic this required behavior, which is typically provided externally by, for example, software in CPU 30.

Figure 5:
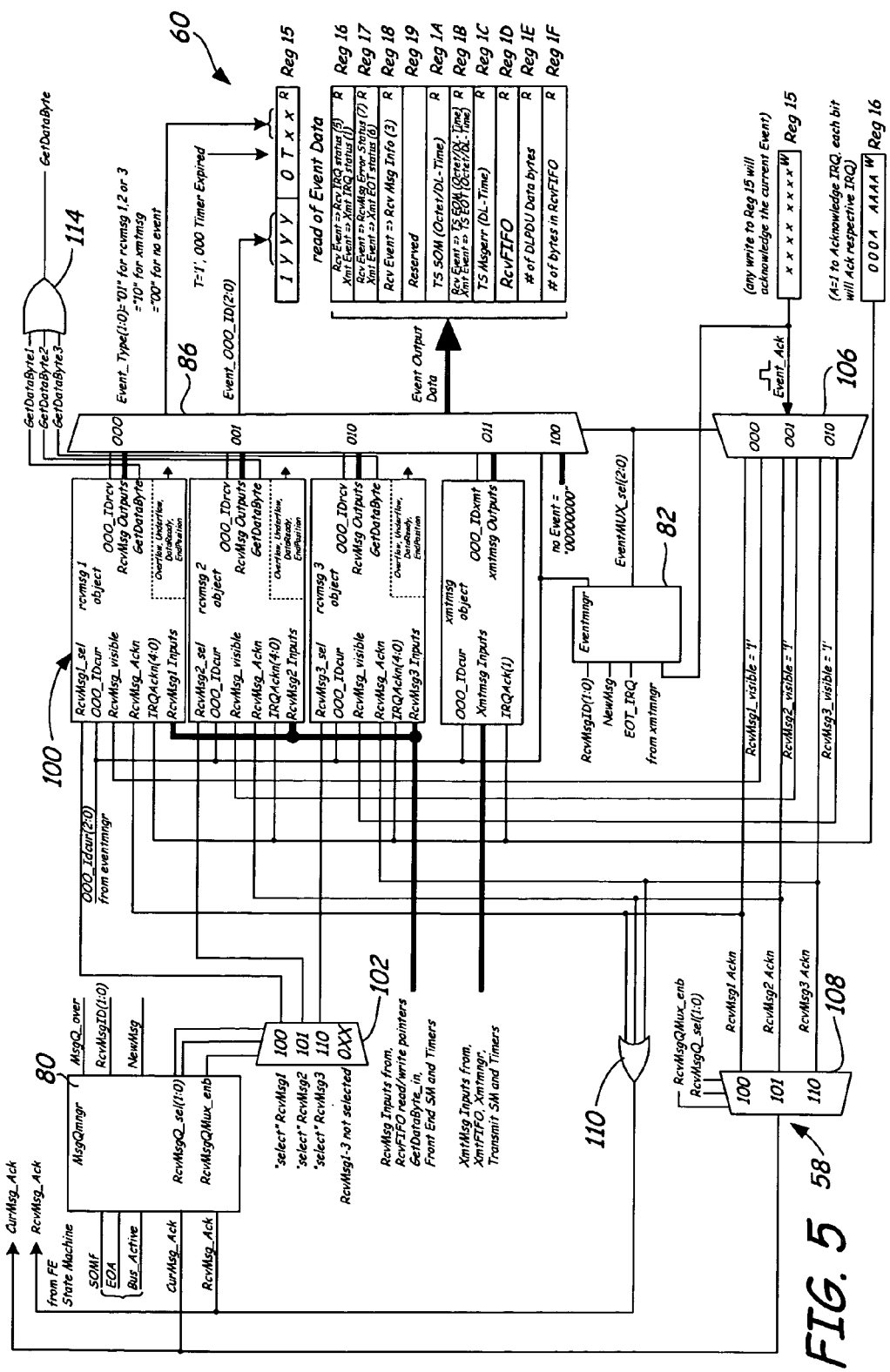
FIG. 5 is a functional block diagram of a receive/transmit event manager for processing data packets received on the communication medium segment.

FIG. 5 is a functional block diagram of receive/transmit event manager 58 for managing processing of data packets received by MAU 38 on segment 12. Receive/transmit event manager 58 includes message queue manager (MsgQmngr) 80, event MUX 86, received message object queue 100, and multiplexers 102, 106, and 108. Received message object queue 100 includes space for three received message objects, labeled rcvmsg1, rcvmsg2, and rcvmsg3. MsgQmngr 80 is connected to received message objects rcvmsg1, rcvmsg2, and rcvmsg3 via MUX 102. Multiplexers 106 and 108 are outside the scope of the present invention, but are shown in FIG. 5 to illustrate the connections between the various components of receive/transmit event manager 58. MUX 106 provides an output to the received message objects and MUX 108 based on an input from register Reg15 of registers 60, and the output of MUX 108 provides an input to MsgQmngr 80. The outputs of MUX 106 is also provide an input to MsgQmngr 80 via OR gate 110. Event manager 82 and transmit manager 84, which were shown in receive/transmit event manager 58 in FIG. 4, are omitted from FIG. 5 for clarity. Also shown in FIG. 5 is a portion (Reg15-Reg1F) of registers 60 for storing event data associated with received and transmitted message objects for an active message.

Receive/transmit event manager 58 allows CPU 30 to read the received message object (rcvmsg1, rcvmsg2, rcvmsg3) associated with each respective message that has occurred in sequence. The received message object for an active message is available for CPU 30 to read via registers 60, and in particular, in registers Reg15 through Reg1F. The transmit message object for an active message is available to MAU 38 for transmission in registers Reg16, Reg17 and Reg1B. Each received message object contains an assortment of message IRQs, errors, status, and information and data regarding receive FIFO memory 50.

The information and data regarding receive FIFO memory 50 includes several attributes readable by software that pertain to the reception state of the message to which the object corresponds. These attributes include Overflow, Underflow, DataReady, EndPosition, and an active flag. Overflow is a Boolean attribute that, when set, indicates that an overflow of receive FIFO memory 50 occurred while receiving a message from the network. Underflow is a Boolean attribute that indicates that the last attempt to read from receive FIFO memory 50 failed due to a lack of data. DataReady is a Boolean attribute that indicates that receive FIFO memory 50 is approaching a full state and needs to be read to prevent overflow of receive FIFO memory 50. EndPosition is an integer attribute that stores position information from receive FIFO memory 50. The active flag of the received message object is set by MsgQmngr 80 when its corresponding message is currently active.

MsgQmngr 80 controls the selection and the enabling of the three received messages. This is controlled via the active flag of the received message object (signals RcvMsg1_sel, RcvMsg2_sel, and RcvMsg3_sel), as selected through MUX 102. Thus, only one received message object (rcvmsg1, rcvmsg2, rcvmsg3) can be active at a time. MsgQmngr 80 allows the events to be associated with the active received message.

In operation, MAU 38 receives messages from segment 12. As a message is received from segment 12, the active flag of a received message object in received message object queue 100 is set. For example, if no data is contained in receive FIFO memory 50 when MAU 38 receives a message, signal RcvMsg1_sel is set by MsgQmngr 80, thereby activating rcvmsg1 in received message object queue 100.

Front end state machine 46 decodes the serial data stream, and converts it to an 8-bit parallel formatted byte. After the formation of the byte, front end state machine 46 creates a write pulse that stores the coded data into the location in receive FIFO memory 50 that is pointed to by a write pointer. As the message DLPDU data is being written into receive FIFO memory 50, the current position of the write pointer to receive FIFO memory 50 is continuously transferred to the EndPosition attribute of the active received message object, and the write pointer is subsequently incremented after each byte is written. Since the data is added to receive FIFO memory 50 in the same order as received message objects are added to received message object queue 100, a consistent ordering is maintained between receive FIFO memory 50 and received message object queue 100.

During the transfer of data from front end state machine 46 to receive FIFO memory 50, receive FIFO memory 50 continuously monitors whether it is approaching its 63-byte storage limit. If the number of unread bytes in receive FIFO memory 50 is equal to or greater than the DataReady threshold, an IRQ is generated by the active received message object. This IRQ sets the DataReady attribute in the active rcvmsg object. The threshold for generating the DataReady IRQ is configurable. The DataReady attribute can subsequently be cleared by software after data is read from receive FIFO memory 50. If receive FIFO memory 50 fills up before data is read from receive FIFO memory 50, receive FIFO memory 50 sends a signal to all rcvmsg objects to set the Overflow attribute. This will prevent further data from being written to receive FIFO memory 50 until data is read from the data queue and software clears the Overflow attribute. The software can determine which received message object (rcvmsg1, rcvmsg2, or rcvmsg3) had the overflow condition, since only the active received message object will have this attribute set.

MsgQmngr 80 controls the selection and the enabling of three received messages. In the case of a fourth message being received before at least one of the other three messages has been acknowledged by CPU 30, MsgQmngr 80 disables any further messages from being received until the event data has been read or acknowledged by forcing RcvMsgQMux_enb low (inactive). This causes all RcvMsg_sel signals low. By having MsgQmngr 80 prevent a fourth received message from coming in, corruption of received message objects rcvmsg1, rcvmsg2, and rcvmsg3 is prevented.

CPU 30 interfaces with a read pointer to receive FIFO memory 50 through the three received message objects (rcvmsg1, rcvmsg2, and rcvmsg3) located in received message object queue 100. When CPU 30 is ready to read the stored DLPDU data from received FIFO memory 50, software in CPU 30 generates a GetDataByte_in command via register Reg1D of registers 30. Any read from register Reg1D places the data from receive FIFO memory 50 immediately onto the data bus for reading by CPU 30. The GetDataByte_in signal is ported to all three received message objects. Only one of the three received message objects is readable (or visible) to CPU 30 at a time. The EventMUX_sel(2:0) signal selects the currently visible received message object for CPU 30 read via MUX 106. There are three visible signals, RcvMsg1_visible, RcvMsg2_visible, and RcvMsg3_visible, which respectively correspond to received message objects rcvmsg1, rcvmsg2, and rcvmsg3.

If, for example, RcvMsg1_visible is active, the GetDataByte1 signal output from received message object rcvmsg1 will be generated. This causes the read pointer to receive FIFO memory 50 to increment one position. GetDataByte2 and GetDataByte3 will remain inactive since they cannot be visible to CPU 30 at the same time as GetDataByte1. Since one of the three GetDataByte outputs is always activated, they are passed through OR gate 114 to create the read pointer increment pulse. As subsequent read operations from received message object rcvmsg1 are performed, the read pointer is compared with the EndPosition value of rcvmsg1. This comparison allows CPU 30 to know the number of bytes in receive FIFO memory 50 for the particular message that is associated with rcvmsg1.

When the read pointer value equals the EndPosition value, there is no data available for the visible received message object, and receive FIFO memory 50 is considered empty for the visible received message object. When no data is available for a visible received message object, an internal Empty flag will be activated. In the event of the generation of an additional read command when the Empty Flag is active, the Underflow attribute for the visible received message object will be set. This attribute is available to be read in register Reg17 of registers 60. The Empty flag prevents the increment of the read pointer from occurring, thus maintaining proper pointer position and integrity of DLPDU data association. This is very important when receive FIFO memory 50 contains DLPDU data that is associated with up to three different received message objects.

CPU 30 may determine the number of bytes to read out of receive FIFO memory 50 for the visible received message object by performing a read operation of Reg1F in registers 60. The value read out of register Reg1F is the difference in position between EndPosition and the read pointer. For example, if received message object rcvmsg1 is visible, and CPU 30 reads 08h from register Reg1F, CPU 30 would require eight read operations (through Reg1D) to completely read all DLPDU data associated with rcvmsg1. This ensures that all DLPDU data associated with the visible received message object is properly read out of receive FIFO memory 50. CPU 30 reads from registers Reg1S through Reg1F of registers 60 for the visible received message object, and subsequently takes a corresponding action based on the information from these registers.

After all information for the visible received message information object has been processed by CPU 30 (such as IRQ status, error status, DLPDU data and time stamp readings), an Event_Ack (event acknowledgement) signal is generated to signal that CPU 30 has completed removing data associated with the visible received message object in received message object queue 100. This signal, which is created by performing a write operation to register Reg15 of registers 60, is ported to event manager 82 and receive FIFO memory 50 to update the EventMUX_sel(2:0) signal. This activates the visible signal of the next received message object in received message object queue 100 (e.g., rcvmsg2), which allows event data registers 60 for the next received message object to be visible to CPU 30. The read sequence heretofore described can then be performed for the next received message object.

In summary, conventional approaches in hardware to handling of messages received on a network require separate data queue elements for storing received messages, and a received message object associated with each separate data queue element for storing information about the messages. In addition, to account for software latency, the hardware designer must provide a large data queues to avoid overflow of the data queues as messages are received from the network. This approach suffers from scalability problems that stem from the data queue depth requirements. The present invention is a communication controller that includes a single data queue and a queue of received message objects. The data queue stores messages received on the communication medium. The received messages are preferably written to the received data memory at a write pointer position and read from the received data memory at a read pointer position. The communications controller also includes received message objects. Each received message object contains information about a corresponding message in the data queue. This represents a queuing solution that can be scaled without incurring any additional data queue overhead. In addition, the data queue depth can be made larger to allow for unknown software latency without greatly affecting the overall data queue storage requirements.

Although the present invention has been described with reference to preferred embodiments, workers skilled in the art will recognize the changes may be made in form and detail without departing from the spirit and scope of the invention.

The invention claimed is:

1. A device for communicating over a communication medium according to an industrial fieldbus protocol, the device comprising:
   a medium attachment unit (MAU) for receiving and transmitting messages on the communication medium according to the industrial fieldbus protocol;
   a central processing unit (CPU) for processing data contained in messages received and creating data to be contained in messages to be transmitted; and
   a communication controller for interfacing between the MAU and the CPU, the communication controller including a data queue and a queue of received message objects, the data queue for storing a plurality of messages received on the communication medium and including a write pointer and a read pointer, the write pointer corresponding to a location in the data queue for storing a new message received from the communication medium, the read pointer corresponding to a location in the data queue for reading a message from the data queue by the CPU, the received message objects each containing information about a corresponding message in the data queue, the information including event data for the message and attributes pertaining to a reception state of the message, wherein, as a message is received on the communication medium, a value of the write pointer is continuously transferred to an EndPosition attribute in a corresponding received message object.

2. The device of claim 1, wherein the write pointer and the read pointer implement the data queue as a first-in-first-out (FIFO) queue.

3. The device of claim 1, wherein each received message object comprises:
   an Overflow attribute readable by software in the CPU, the Overflow attribute indicating whether an overflow occurred in the data queue while receiving a message from the communication medium;
   an Underflow attribute readable by software in the CPU, the Underflow attribute indicating whether a read from the data queue failed due to lack of data;
   a DataReady attribute readable by software in the CPU, the DataReady attribute indicating that the data queue is almost full;
   an EndPosition attribute for storing position information from the data queue; and
   an active flag for selecting and enabling the received message object.

4. The device of claim 3, wherein the Underflow attribute is set in a received message object when the read pointer has a same value as the EndPosition attribute.

5. The device of claim 3, wherein the data queue sets the DataReady signal when the data queue reaches a depth that is greater than a predetermined threshold depth.

6. The device of claim 1, wherein the data queue is stored in a ring buffer.

7. A communication controller for processing messages received over a communication medium according to an industrial fieldbus protocol, the communication controller comprising:
   a received data memory for storing messages received from the communication medium according to the industrial fieldbus protocol, wherein the messages are written to the received data memory at a write pointer position and read from the received data memory at a read pointer position; and
   a plurality of received message objects for storing information related to the messages stored in the received data memory, each received message object corresponding to a message stored in the received data memory, the information including event data for the message and attributes pertaining to a reception state of the message, wherein, as the active message is received from the communication medium, a value of the write pointer is continuously transferred to an EndPosition value in a corresponding received message object.

8. The communication controller of claim 7, further comprising
   a message queue manager for associating an active message in the received data memory its corresponding received message object.

9. The communication controller of claim 8, wherein the received data memory sets an Underflow attribute in the received message object corresponding to the active message when the read pointer has a same value as the EndPosition value in the active received message object.

10. The communication controller of claim 7, wherein the received data memory sets a DataReady attribute in all received message objects when the received data memory nears capacity.

11. The communication controller of claim 7, wherein the write pointer and the read pointer change locations during read and write processes to implement the data queue as a first-in-first-out (FIFO) queue.

12. A method of handling messages received by a device on a process control network, the method comprising:
   receiving messages from the process control network according to an industrial fieldbus protocol;
   updating received message objects which contain information related to the messages, the information including event data for the message and attributes pertaining to a reception state of the message; and
   writing the messages to a received data memory starting at a write pointer position, the received data memory for storing a data queue;
   incrementing the write pointer position until the message is written to the received data memory; and
   transferring a value of the write pointer to an EndPosition attribute in the received message object as the message is received from the process control network.

13. The method of claim 12, wherein writing the message comprises:
   setting an active flag in a first available received message object in a received message object queue; and
   determining the write pointer position in the received data memory.

14. The method of claim 13, further comprising:
   setting a DataReady attribute in the received message object if the received data memory is almost full.

15. The method of claim 13, further comprising:
   setting an Overflow attribute in the received message object if the received data memory becomes full while receiving a message from the process control network.

16. The method of claim 12, updating a received message object comprises:
   updating a plurality of attributes maintained in the received message object including message interrupt requests (IRQs), message errors, message status, and received data memory information.

17. The method of claim 12, further comprising:
   providing the messages to a central processing unit (CPU) in a first-in-first-out (FIFO) order.

18. The method of claim 17, wherein providing the messages to a CPU comprises:
   setting an active flag of a received message object at a front of received message object queue;
   determining a read pointer position in the received data memory;
   transferring the message to the CPU starting at the read pointer position;
   incrementing the read pointer position until the message is transferred to the CPU; and
   removing the received message object from the received message object queue.

19. The method of claim 18, further comprising:
   setting an Underflow attribute in the received message object when the read pointer has a same value as an EndPosition attribute in the received message object.

* * * * *